United States Patent [19]

Suzuki et al.

[11] Patent Number: 5,650,467
[45] Date of Patent: Jul. 22, 1997

[54] CURABLE COMPOSITION

[75] Inventors: Mikiko Suzuki; Jo Kawamura; Hiroshi Iwakiri; Fumio Kawakubo, all of Hyogo, Japan

[73] Assignee: Kanegafuchi Kagaku Kogyo Kabushiki Kaisha, Osaka, Japan

[21] Appl. No.: 583,954

[22] Filed: Jan. 11, 1996

Related U.S. Application Data

[63] Continuation of Ser. No. 405,029, Mar. 16, 1995, abandoned.

[30] Foreign Application Priority Data

Mar. 25, 1994 [JP] Japan .................................. 6-077851

[51] Int. Cl.$^6$ ........................................................ C08L 83/14
[52] U.S. Cl. ........................ 525/100; 525/404; 156/329; 156/332
[58] Field of Search ................................ 525/100, 404; 156/325

[56] References Cited

U.S. PATENT DOCUMENTS 5,063,270  11/1991  Yukimoto et al. ........................ 524/306
5,109,064   4/1992  Wakabayashi et al. .................. 525/100

FOREIGN PATENT DOCUMENTS 0 339 666  11/1989  European Pat. Off. .
0 442 380   8/1991  European Pat. Off. .
0 532 049   3/1993  European Pat. Off. .

Primary Examiner—Ralph H. Dean
Attorney, Agent, or Firm—Armstrong, Westerman, Hattori, McLeland & Naughton

[57] ABSTRACT

A curable resin composition is disclosed which is composed of (a) an oxyalkylene polymer containing at least one reactive silicon group per molecule and having a number average molecular weight of not less than 3000 and an Mw/Mn ratio of not higher than 1.6, (b) a copolymer having a molecular chain which comprises (A) an alkyl acrylate monomer unit and/or an alkyl methacrylate monomer unit each having 1 to 8 carbon atoms in the alkyl moiety thereof and (B) an alkyl acrylate monomer unit and/or an alkyl methacrylate monomer unit each having 10 or more carbon atoms wherein the total number of monomer units (A) and monomer units (B) constitutes more than 50% of the monomer units in the copolymer (b), and (c) a curing catalyst.

21 Claims, No Drawings

CURABLE COMPOSITION

This application is a File Wrapper Continuation of application Ser. No. 08/405,029, filed on Mar. 16, 1995, now abandoned.

FIELD OF THE INVENTION

The present invention relates to a curable composition useful as a contact adhesive. A contact adhesive is an adhesive which is allowed to stand for a prescribed time after being applied to one or more adherend and being assembled thereto.

BACKGROUND OF THE INVENTION

Conventionally widespread contact adhesives are of a solvent type comprising an organic solvent having uniformly dissolved therein 20 to 35% of solid matter, comprising natural rubber or a diene compound polymer such as a synthetic rubber and additives such as a tackifying resin, a plasticizer, and an antioxidant. However, adhesives of the solvent type are costly due to a use of large amounts of an organic solvent. Besides, the organic solvent must be evaporated, which involves deterioration of the working environment, danger of fire, and air pollution.

In order to provide an adhesive which is free from the above problems while exhibiting adhesion performance comparable to the conventional solvent type adhesives, a contact adhesive of a solventless type comprising a modified silicone polymer has been proposed as disclosed in JP-A-3-263478 (the term "JP-A" as used herein means an "unexamined published Japanese patent application").

However, the contact adhesive using a modified silicone polymer as disclosed in JP-A-3-263478 is disadvantageous in that it requires a long time for developing sufficient tackiness for making assembly possible (hereinafter referred to as a tack developing time) and that it has insufficient tack strength and poor workability due to its high viscosity.

An object of the present invention is to provide a curable composition which develops tackiness rapidly, retains the developed tackiness for a long time (the time during which the tackiness is exhibited will hereinafter be referred to as a tack range), exhibits sufficient tack strength, satisfactory initial and final adhesive strength, and is excellent in workability. In particular, the present invention is to provide a curable composition which develops sufficient tackiness rapidly and forms excellent cured products.

SUMMARY OF THE INVENTION

The above object of the present invention is to provide a curable composition comprising (a) an oxyalkylene polymer containing at least one reactive silicon group per molecule and having a number average molecular weight of not less than 3000 and an Mw/Mn ratio of not higher than 1.6, (b) a copolymer whose molecular chain substantially comprises (A) an alkyl acrylate monomer unit and/or an alkyl methacrylate monomer unit each having 1 to 8 carbon atoms in the alkyl moiety thereof and (B) an alkyl acrylate monomer unit and/or an alkyl methacrylate monomer unit each having 10 or more carbon atoms, and (c) a curing catalyst.

DETAILED DESCRIPTION OF THE INVENTION

The oxyalkylene polymer which can be used in the present invention as component (a) includes polymers having a molecular chain represented by formula (1):

$$-(R-O)_n- \quad (1)$$

wherein R represents a divalent alkylene group having 2 to 4 carbon atoms; and n represents the number of repeating units.

From the viewpoint of availability of the formula (R—O) in formula (1), an oxyalkylene polymer having a repeating unit represented by formula (2) shown below is preferred:

$$-CH(CH_3)CH_2O- \quad (2)$$

The above oxyalkylene polymer may have a straight-chain or a branched structure, or a mixed structure thereof. The polymer may contain other monomer units but preferably comprises the monomer unit of formula (1) in a proportion of at least 50% by weight, particularly 80% by weight or more.

Oxyalkylene polymers having a number average molecular weight (Mn) of 3,000 or more are effectively usable. Those having an Mn of 3,000 to 50,000, particularly 3,000 to 30,000, are preferred. The ratio (Mw/Mn) of weight average molecular weight (Mw) to number average molecular weight (Mn) is not higher than 1.6, which indicates that the polymer has an extremely narrow molecular weight distribution (i.e., it is highly monodisperse). The Mw/Mn ratio is preferably not higher than 1.5, still preferably not higher than 1.4. While molecular weight distribution is measurable by various methods, it is generally measured by gel-permeation chromatography (GPC). Since the oxyalkylene polymer has such a narrow molecular weight distribution in spite of a great number average molecular weight, the composition of the present invention has a low viscosity and is easy to handle before curing while showing satisfactory rubbery elastic behavior after curing.

The oxyalkylene polymer (a) is an organic polymer having at least one reactive silicon group per molecule and having an Mw/Mn ratio of not more than 1.6. The terminology "reactive silicon group" in the polymer denotes a silicon-containing group in which a hydrolyzable group or a hydroxyl group is bonded to the silicon atom and which is crosslinkable through silanol condensation reaction. While not limited thereto, typical reactive silicon groups are represented by formula (3)

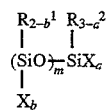

(3)

wherein $R^1$ and $R^2$ each represents an alkyl group having 1 to 20 carbon atoms, an aryl group having 6 to 20 carbon atoms, an aralkyl group having 7 to 20 carbon atoms or a triorganosiloxy group represented by $(R')_3SiO-$, wherein each of the three $R'$ groups, which may be the same or different, represents a monovalent hydrocarbon group having 1 to 20 carbon atoms; when there are two or more of each of the $R^1$ or $R^2$ groups, each of the $R^1$ and $R^2$ groups may be the same or different, and the $R^1$ can be the same or different from $R^2$; X represents a hydroxyl group or a hydrolyzable group; when there are two or more X groups, they may be the same or different; a represents 0, 1, 2 or 3; b represents 0, 1 or 2; b for $R^1$ and b for X in different units of formula:

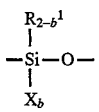

may be the same or different; and m represents 0 or an integer of from 1 to 19 satisfying the relationship a+Σb≧1.

The hydrolyzable group represented by X is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxy group, a mercapto group, and an alkenyloxy group. An alkoxy group, e.g., a methoxy group, is particularly preferred for ease in handling due to its mild hydrolyzability.

One to three hydroxyl groups or hydrolyzable groups may be bonded to one silicon atom, and (a+Σb) is preferably 1 to 5. Where two or more hydroxyl groups or hydrolyzable groups are present per reactive silicon group, they may be the same or different.

The reactive silicon group may have one or more silicon atoms. A reactive silicon group in which silicon atoms are linked to form siloxane bondings may have as much as 20 silicon atoms.

From the standpoint of availability, reactive silicon groups represented by formula (4) shown below are preferred:

$$\begin{array}{c} R^1_{3-a} \\ | \\ Si-X_a \end{array} \qquad (4)$$

wherein $R^1$, X, and a are as defined above $R^1$ and $R^2$ in formula (3) specifically include an alkyl group, e.g., methyl or ethyl; a cycloalkyl group, e.g., cyclohexyl; an aryl group, e.g., phenyl; an aralkyl group, e.g., benzyl; and a triorganosiloxy group of formula $(R')_3SiO—$ in which R' is methyl or phenyl. $R^1$, $R^2$, and R' each preferably represents a methyl group.

The oxyalkylene polymer contains at least one, preferably 1.1 to 5, reactive silicon groups per molecule. If the number of the reactive silicon group per molecule is less than 1, the polymer has insufficient curability, failing to achieve satisfactory rubbery elasticity.

The reactive silicon group may be placed either at the terminal or in the inside of the molecular chain of the oxyalkylene polymer. An oxyalkylene polymer having the reactive silicon group at the molecular terminal thereof tends to provide a rubbery cured product having high tensile strength and high elongation.

The oxyalkylene polymer having a reactive silicon group is preferably obtained by introducing a reactive silicon group into the above-mentioned oxyalkylene polymer having a functional group.

Introduction of a reactive silicon group may be carried out in a conventional manner, for example, as follows. (I) An oxyalkylene polymer having a functional group, such as a hydroxyl group, in the molecule thereof is reacted with an organic compound having a group reactive with the functional group and an unsaturated group to obtain an oxyalkylene polymer having unsaturated group. Alternatively, the oxyalkylene polymer is copolymerized with an unsaturated group-containing epoxy compound to obtain an unsaturated group-containing oxyalkylene polymer. The resulting reaction product is then hydrosilylated with a hydrosilane having a reactive silicon group. (II) An unsaturated group-containing oxyalkylene polymer, obtained in the same manner as in (I) above, is reacted with a compound having a mercapto group and a reactive silicon group. (III) An oxyalkylene polymer having a functional group, such as a hydroxyl group, an epoxy group or an isocyanate group (hereinafter referred to as a Y functional group), in the molecule thereof is reacted with a compound having a group reactive with the Y functional group (hereinafter referred to as a Y' functional group) and a reactive silicon group.

The silicon compound having a Y' functional group includes an amino-containing silane, such as γ-(2-aminoethyl)aminopropyltrimethoxysilane, γ-(2-aminoethyl)aminopropylmethyldimethoxysilane or γ-aminopropyltriethoxysilane; a mercapto-containing silane, such as γ-mercaptopropyltrimethoxysilane or γ-mercaptopropylmethyldimethoxysilane; an epoxysilane, such as γ-glycidoxypropyltrimethoxysilane or β-(3,4-epoxycyclohexyl)ethyltrimethoxysilane; a vinyl type unsaturated group-containing silane, such as vinyltriethoxysilane, γ-methacryloyloxypropyltrimethoxysilane or γ-acryloyloxypropylmethyldimethoxysilane; a chlorine-containing silane, such as γ-chloropropyltrimethoxysilane; an isocyanate-containing silane, such as γ-isocyanatopropyltriethoxysilane or γ-isocyanatopropylmethyldimethoxysilane; and a hydrosilane, such as methyldimethoxysilane, trimethoxysilane or methyldiethoxysilane. The silicon compounds containing a Y' functional group are by no means limited to these examples.

Among the above-mentioned methods, the method (I) and the method (III), in which a polymer having a hydroxyl group at the terminal thereof is reacted with a compound having an isocyanate group and a reactive silicon group, are preferred.

While not limited thereto, the above-described reactive silicon group-containing oxyalkylene polymers typically include those disclosed in JP-A-50-156599, JP-A-54-6069, JP-A-57-126823, JP-A-59-78223, JP-A-55-82123, JP-A-55-131022, JP-A-55-47825, JP-A-62-230822, JP-A-63-83131, JP-A-3-47825, JP-A-3-72527, JP-A-3-122152, U.S. Pat. Nos. 3,632,557, 4,345,053, 4,366,307, and 4,960,844.

The alkyl (meth)acrylate copolymer which can be used in the present invention as component (b) (hereinafter referred to as copolymer (b)), comprises as monomer units (A) alkyl (meth)acrylate unit having 1 to 8 carbon atoms in the alkyl moiety and represented by formula (5):

$$—[CH_2—C(R^4)(COOR^3)—]— \qquad (5)$$

wherein $R^3$ represents an alkyl group having 1 to 8 carbon atoms; $R^4$ represents a hydrogen atom or a methyl group.

The alkyl (meth)acrylate copolymer (b) also comprises as monomer units (B) alkyl (meth)acrylate units having 10 or more carbon atoms in the alkyl moiety and represented by formula (6):

$$—[CH_2—C(R^4)(COOR^5)—]— \qquad (6)$$

wherein $R^4$ is as defined above; and $R^5$ represents an alkyl group having 10 or more carbon atoms.

$R^3$ in formula (5) includes alkyl groups having 1 to 8 carbon atoms, such as methyl, ethyl, propyl, t-butyl and 2-ethylhexyl, preferably those having 1 to 4 carbon atoms, still preferably those having 1 to 2 carbon atoms. The alkyl groups represented by $R^3$ in copolymer (b) may be the same or of plural species throughout the repeating units of the polymer.

$R^5$ in formula (6) includes alkyl groups having 10 or more, usually 10 to 30, and preferably 10 to 20 carbon atoms, such as lauryl, tridecyl, cetyl, stearyl, and behenyl ($C_{22}$). Containing a monomer unit having such a long-chain alkyl group, the copolymer (b) exhibits compatibility with oxyalkylene polymer (a). The alkyl group represented by $R^5$ in copolymer (b) may be the same or may be of two or more species throughout the repeating units of the polymer, e.g., Rs being a $C_{12}$ alkyl group and a $C_{13}$ alkyl group.

The molecular chain of copolymer (b) substantially comprises monomer units (A) and (B). The term "substantially" as used herein means that the proportion of monomer units (A) and (B) in copolymer (b) exceeds 50%, preferably 70% or more. Where the proportion of monomer units (A) and (B) is less than 50%, the copolymer (b) is less compatible with oxyalkylene copolymer (a), tending to cause white turbidity and to exhibit reduced adhesion characteristics.

The ratio of monomer unit (A) to monomer unit (B) preferably ranges from 95/5 to 40/60, still preferably from 90/10 to 60/40. If the ratio exceeds 95/5, the compatibility tends to be reduced. If it is lower than 40/60, an economical disadvantage may result.

Copolymer (b) may further contain, in addition of monomer units (A) and (B), monomer units derived from monomers copolymerizable with monomer units (A) and (B). Such monomer units include those derived from monomers having a —COOH group, e.g., acrylic acid and methacrylic acid; those derived from monomers having an amido group, e.g., acrylamide, methacrylamide, N-methylolacrylamide, and N-methylolmethacrylamide; those derived from monomers having an epoxy group, e.g., glycidyl acrylate and glycidyl methacrylate; those derived from monomers having an amino group, e.g., diethylaminoethyl acrylate, diethylaminoethyl methacrylate, and aminoethyl vinyl ether; and those derived from acrylonitrile, iminol methacrylate, styrene, α-methylstyrene, alkyl vinyl ethers, vinyl chloride, vinyl acetate, vinyl propionate, ethylene, etc.

From the standpoint of ease in handling, copolymer (b) preferably has a number average molecular weight of 500 to 100,000, still preferably 1,000 to 30,000.

Copolymer (b) may contain a reactive silicon group. Copolymer (b) having a reactive silicon group has improved compatibility with copolymer (a) which leads to high adhesive strength.

Where copolymer (b) contains a reactive silicon group, it preferably contains, on the average, 0.1 to 10.0, still preferably 0.5 to 5.0, particularly 0.5 to 2.5, reactive silicon groups per molecule.

Copolymer (b) used in the present invention is obtained by vinyl polymerization, for example, vinyl polymerization through radical reaction, of monomers providing units represented by formulae (5) and (6) and other copolymerizable monomers and, if desired, a compound having a polymerizable unsaturated bond and a reactive silicon group in accordance with conventional solution polymerization or bulk polymerization techniques.

The reaction may usually be carried out using a reaction system comprising the above-mentioned monomers, a radical initiator, a chain transfer agent, a solvent, etc., at 50° to 150° C.

Examples of suitable radical initiators are azobisisobutyronitrile and benzoyl peroxide. Examples of suitable chain transfer agents are n-dodecylmercaptan and t-dodecylmercaptan. Suitable solvents include inert solvents, such as ethers and hydrocarbons.

Introduction of a reactive silicon group into the copolymer (b) can be effected through various methods including, for example: (i) a method of copolymerizing a compound having a polymerizable unsaturated bond and a reactive silicon group (e.g., $CH_2$=$CHSi(OCH_3)_3$) and monomers providing units of formulae (5) and (6), and (ii) a method comprising copolymerizing a compound having a polymerizable unsaturated bond and a reactive functional group (hereinafter referred to as a Y" group) (e.g., acrylic acid) with monomers providing units of formulae (5) and (6) and reacting the resulting copolymer with a compound having a reactive silicon group and a functional group capable of reacting with the Y" group (e.g., a compound having an isocyanate group and an —$Si(OCH_3)_3$ group).

The above-mentioned compound having a polymerizable unsaturated bond and a reactive silicon group includes compounds represented by formula (7):

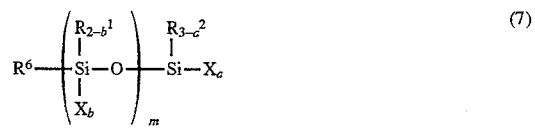

wherein $R^6$ represents an organic residue having a polymerizable unsaturated bond; and $R^1$, $R^2$, X, a, b, and m are as defined above.

The compounds represented by formula (7) preferably include those represented by formula (8):

wherein $R^4$ and X are as defined above; c represents 1, 2 or 3; and Q represents a divalent organic group, such as —$COOR^8$ (wherein $R^8$ represents a divalent alkylene group having 1 to 6 carbon atoms, e.g., —$CH_2$— or —$CH_2CH_2$—), —$CH_2C_6H_4CH_2CH_2$— or —$CH_2OCOC_6H_4COO(CH_2)_3$—, or a direct bond.

Specific examples of the compounds represented by formula (7) or (8) include:

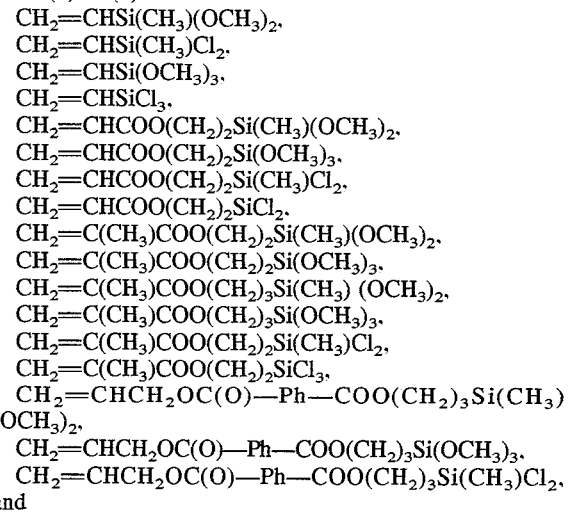

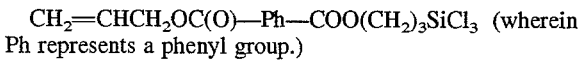 (wherein Ph represents a phenyl group.)

Copolymer (b) is preferably used in an amount of from 20 to 200 parts by weight, still preferably from 30 to 160 parts by weight, per 100 parts by weight of oxyalkylene polymer (a); for, in this range, both polymers (a) and (b) exhibit remarkable improving effects on the characteristics of the adhesive. The specific ratio of copolymer (b) to oxyalkylene polymer (a) is usually selected from the above range according to the end use and intended performance.

The catalyst which may be used in the present invention as component (c) is a catalyst for making the above-described polymers form a three-dimensional network structure and be cured to obtain a solid with rubbery elasticity. A broad range of known silanol condensation catalysts (curing catalysts) can be employed as component (c). Suitable examples of silanol condensation catalysts include titanic esters, such as tetrabutyl titanate and tetrapropyl titanate; tin carboxylates, such as dibutyltin dilaurate, dibutyltin maleate, dibutyltin diacetate, tin octylate, tin naphthenate, tin laurate, and tin ferzalate; a reaction product of dibutyltin oxide and a phthalic ester; dibutyltin diacetylacetonate; organoaluminum compounds, such as trisacetylacetonatoaluminum, tris(ethylacetoacetato) aluminum, and ethylacetoacetatodiisopropoxyaluminum; chelate compounds, such as tetraacetylacetonatozirconium and tetraacetylacetonatotitanium; lead octylate; iron naphthenate; bismuth compounds, such as bismuth tris (neodecanoate) and bismuth tris(2-ethylhexoate); amine compounds, such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0)undecene-7 (DBU); salts of these amine compounds with a carboxylic acid, etc.; low-molecular polyamide resins obtained from an excess polyamine and a polybasic acid; a reaction product of an excess polyamine and an epoxy compound; silane coupling agents having an amino group, such as γ-aminopropyltrimethoxysilane and N-(β-aminoethyl) aminopropylmethyldimethoxysilane; and other acidic catalysts and basic catalysts. These catalysts may be used either individually or as a combination of two or more thereof.

The silanol condensation catalyst is used in an amount preferably of from 0.01 to 20 parts by weight, still preferably of from 0.1 to 10 parts by weight, per 100 parts by weight of the oxyalkylene polymer. If the amount of the silanol condensation catalyst is too small with respect to the oxyalkylene polymer, the curing rate becomes low, and the curing reaction does not proceed sufficiently. On the other hand, when the amount of the silanol condensation catalyst is too large with respect to the oxyalkylene polymer, there is a tendency that curing is excessively accelerated, causing adverse influences on workability.

If desired, the tacky adhesive using the curable composition according to the present invention may further contain adhesive resins, fillers, plasticizers, pigments, silicon compounds, ultraviolet absorbents, antioxidants, solvents, and the like in addition to the effective components (a), (b), and (c).

Methods for preparing the contact adhesive using the curable composition of the present invention are not particularly restricted. For example, the contact adhesive can be prepared by compounding the above-described components and kneading the mixture at room temperature or under heating by means of a mixer, a roll, a kneader, etc. or dissolving the mixture with a small amount of an appropriate solvent. Further, the contact adhesive may be formulated into either a one-pack type or a two-pack type adhesive by appropriately combining the components.

The method for applying the adhesive is not limited also. For example, the adhesive may be applied in a usual manner with a spatula, a roller, a spray gun, etc.

In carrying out adhesion, the adhesive is allowed to stand in open air for a given period of time after being applied to one or more adherend whereby curing proceeds by action of moisture in the air to develop tackiness. Development of tackiness may be accelerated by heating or humidifying. While tackiness is still present, the adherends are bonded together.

The contact adhesive using the curable composition of the present invention is characterized by using an oxyalkylene polymer having a number average molecular weight of not less than 3000 and an Mw/Mn ratio of not higher than 1.6, as a result of which the adhesive has remarkably improved workability and develops tackiness more rapidly as compared with conventional solventless type tacky adhesives. Further, the adhesive is excellent in weather resistance and storage stability on account of copolymer (b) containing a long-chain alkyl group. Hence, the curable composition of the present invention is expected to find broader application than ever as a solventless type contact adhesive.

The present invention provides a curable composition which develops tack more rapidly and has a longer tack range as compared with conventional compositions comprising an oxyalkylene polymer and a copolymer comprising alkyl (meth)acrylate monomer units. Further, the composition exhibits satisfactory initial and final adhesion as well as excellent workability and is therefore useful as a contact adhesive.

The curable composition of the present invention will now be illustrated with reference to Examples.

The present invention will be described in greater detail by way of Synthesis Examples and Examples, but it should be understood that the present invention is not limited thereto.

SYNTHESIS EXAMPLE 1

One mole of polypropylenetriol having a number average molecular weight of 15,000 (Mw/Mn=1.38; viscosity: 89 poise) and 3 moles of γ-isocyanatopropylmethyldimethoxysilane were reacted in the presence of dibutyltin dilaurate to obtain a colorless transparent polymer. The IR spectrum was obtained before and after the reaction. As a result, disappearance of the absorption due to NCO at around 2280 $cm^{-1}$ and appearance of absorption due to C=O at about 1730 $cm^{-1}$ lent confirmation to the production of an oxyalkylene polymer having a methyldimethoxysilyl group at the molecular terminal thereof.

SYNTHESIS EXAMPLE 2

Polypropylene glycol having a number average molecular weight of 15,000 (Mw/Mn=1.26; viscosity: 110 poise) was treated with sodium methoxide and then reacted with allyl chloride to convert the terminal hydroxyl group to an unsaturated group.

One mole of the resulting unsaturated group-terminated polyoxyalkylene was reacted with 2 moles of dimethoxymethylsilane in the presence of chloroplatinic acid to obtain a yellow transparent oxyalkylene polymer having a methyldimethoxysilyl group at the molecular terminal thereof.

SYNTHESIS EXAMPLE 3

Polypropylenetriol having a number average molecular weight of 20,000 (Mw/Mn=1.267; viscosity: 195 poise) was treated with sodium methoxide and then reacted with allyl chloride to convert a terminal hydroxyl group to an unsaturated group.

One mole of the resulting unsaturated group-terminated polyoxyalkylene was reacted with 3 moles of dimethoxymethylsilane in the presence of chloroplatinic acid to obtain a yellow transparent oxyalkylene polymer having a methyldimethoxysilyl group at the molecular terminal thereof.

COMPARATIVE SYNTHESIS EXAMPLE 1

A mixture of polypropylene glycol (number average molecular weight: 2,500) and polypropylenetriol (number average molecular weight: 3,000) was used as a starting material. The mixture was treated with sodium methoxide, subjected to chain extending reaction using methylene chloride, and subsequently reacted with allyl chloride to convert the terminal hydroxyl group to an unsaturated group.

One mole of the resulting unsaturated group-terminated polyoxyalkylene was reacted with 2.5 moles of dimethoxymethylsilane in the presence of chloroplatinic acid to obtain a yellow transparent polymer. The amount of hydrogenated silicon in the reaction solution was determined by IR spectroscopic analysis and, as a result, production of an oxyalkylene polymer having a methyldimethoxysilyl group at the molecular terminal thereof was confirmed.

The viscosity of the polymers obtained in Synthesis Examples 1, 2, and 3 and Comparative Synthesis Example 1 was measured with a Brookfield viscometer (BM type rotor No. 4; 12 rpm) at 23° C. The number average molecular weight (Mn) and the molecular weight distribution (Mw/Mn) of each polymer were analyzed by gel-permeation chromatography (GPC). GPC was carried out by using a column packed with polystyrene gel (produced by Tosoh Corp.) and tetrahydrofuran as an eluent at an oven temperature of 40° C. The results obtained are shown in Table 1.

TABLE 1

| Polymer | Viscosity (poise) | Number Average Molecular Weight (Mn) | Molecular Weight Distribution (Mw/Mn) |
| --- | --- | --- | --- |
| Synthesis Example 1 | 150 | $1.7 \times 10^4$ | 1.4 |
| Synthesis Example 2 | 160 | $1.8 \times 10^4$ | 1.3 |
| Synthesis Example 3 | 220 | $2.3 \times 10^4$ | 1.4 |
| Comparative Example 1 | 240 | $1.5 \times 10^4$ | 2.3 |

SYNTHESIS EXAMPLE 4

Synthesis of Copolymer (b)

A mixture of 5.9 g of butyl acrylate, 66 g of methyl methacrylate, 13.2 g of stearyl methacrylate, 5.4 g of γ-methacryloxypropylmethyldimethoxysilane, 7.2 g of γ-mercaptopropylmethyldimethoxysilane, and 36 g of toluene was prepared. In the mixture was dissolved 3 g of azobisisobutyronitrile as a polymerization initiator. The resulting solution was added dropwise to 30 g of toluene heated at 110° C. over 6 hours. The mixture was allowed to polymerize for 2 hours to obtain copolymer (b) having a solid content concentration of 60% and a number average molecular weight (Mn) of 2,200 as measured by GPC (on polystyrene conversion).

EXAMPLE 1

The reactive silicon group-containing oxyalkylene polymer (a) obtained in Synthesis Example 1 and the copolymer (b) obtained in Synthesis Example 4 were blended in a weight ratio of 60/40 on a solid basis. The blend was evaporated in an evaporator by heating at 110° C. under reduced pressure to obtain a clear viscous liquid having a solid content of 99% or more. To the liquid were added 2 parts by weight of vinyltrimethoxysilane (A-171, produced by Nippon Unicar Co., Ltd.) and 1 part by weight of N-β(aminoethyl)-γ-aminopropylmethyldimethoxysilane as silane compounds and 2 parts by weight of a dibutyltin compound (#918, produced by Sankyo Yuki Gosei K.K.) as a curing catalyst for an oxyalkylene polymer, and the mixture was uniformly mixed to prepare a one-pack type curable composition of the present invention.

EXAMPLE 2

A curable composition of the present invention was prepared in the same manner as in Example 1, except for using the reactive silicon group-containing oxyalkylene polymer (a) obtained in Synthesis Example 2.

EXAMPLE 3

A curable composition of the present invention was prepared in the same manner as in Example 1, except for using the reactive silicon group-containing oxyalkylene polymer (a) obtained in Synthesis Example 3.

COMPARATIVE EXAMPLE 1

A curable composition of the present invention was prepared in the same manner as in Example 1, except for using the reactive silicon group-containing oxyalkylene polymer (a) obtained in Comparative Synthesis Example 1.

Evaluation of Physical Properties

Tack Range and Tack Strength

Each of the contact adhesives prepared in Examples 1 to 3 and Comparative Example 1 was spread thin on a soft steel plate and allowed to stand at 23° C. and under 50% RH. A tack development time (time required for developing tackiness), tack strength, and tack range (the time from tack development to tack disappearance) were evaluated by finger touch. The tack strength was evaluated in comparison with the curable composition of Comparative Example 1 and rated according to the following standard:

⊙ . . . Considerably stronger

○ . . . Substantially equal

△ . . . Weaker

Adhesive Strength Under Shear

A test specimen for tensile shear strength measurement in accordance with JIS K6850 was prepared by applying each curable composition to one of two JIS H4000 aluminum plates A-1050P (100×25×2 mm) with a spatula and, after 5 minutes from the application, adhering the plates by manually pressing. After curing the specimen at 23° C. for 2 hours, a tensile shear test was conducted to evaluate initial adhesion. Further, the specimen was cured at 23° C. for 2 days and then at 50° C. for 3 days, and then a tensile test was conducted to evaluate final adhesion.

Peel Strength

Peel strength was evaluated by a T-peel test in accordance with JIS K6854. Each curable composition was applied with a spatula to one of a pair of JISH4000 aluminum plates A-2050P (200×25×0.1 mm) with a thickness of about 0.5 mm. After 5 minutes from the application, the aluminum plates were bonded together by giving 5 one-way rollings with a 5 kg hand roller in the longitudinal direction. The thus prepared specimen was cured at 23° C. for 2 hours and subjected to a tensile test at a pulling speed of 200 mm/min to evaluate initial adhesion. Further, the specimen was cured at 23° C. for 2 days and then at 50° C. for 3 days and tested similarly to evaluate final adhesion.

Workability

Each curable composition was stirred with a spatula at 23° C. and under 50% RH, and the stirring workability was evaluated in comparison with the curable composition of Comparative Example 1 and rated according to the following standard:

⊙ . . . Considerably easier to stir

○ . . . Easier to stir

Δ . . . Substantially equal in ease of stirring x . . . Considerably hard to stir

TABLE 2

|  | Example 1 | Example 2 | Example 3 | Compara. Example 1 |
|---|---|---|---|---|
| Tack: |  |  |  |  |
| Tack developing time (min) | 12 | 10 | 9 | 18 |
| Tack strength | ⊙ | ⊙ | ⊙ | control |
| Tack range (min) | 50 | 40 | 50 | 15 |
| Shear: |  |  |  |  |
| Initial adhesion (kgf/cm²) | 25 | 9 | 28 | 17 |
| Final adhesion (kgf/cm²) | 76 | 42 | 80 | 42 |
| Peel: |  |  |  |  |
| Initial adhesion (kgf/25 mm) | 8.5 | 5.2 | 11.3 | 5.5 |
| Final adhesion (kgf/25 mm) | 7.5 | 6.3 | 10.1 | 6.7 |
| Workability | ⊙ | ⊙ | Δ | control |

As is apparent from Table 2, it can be seen that use of the oxyalkylene polymer having an Mw/Mn ratio of not more than 1.6 provides a curable composition which develops tack rapidly, high tackiness, and has a long tack range as well as excellent workability and, on curing, exhibits reasonable initial and final strength.

In particular, it should be noted that the curable composition of the present invention develops high tackiness rapidly and sufficiently.

While the invention has been described in detail and with reference to specific embodiments thereof, it will be apparent to one skilled in the art that various changes and modifications can be made therein without departing from the spirits and scope thereof.

What is claimed is:

1. A contact adhesive using a curable composition comprising (a) an oxyalkylene polymer containing at least one reactive silicon group per molecule and having a number average molecular weight of not less than 3000 and an Mw/Mn ratio of not higher than 1.6, (b) a copolymer having a molecular chain which comprises monomer units (A) and monomer units (B), wherein (A) is at least one member selected from the group consisting an alkyl acrylate monomer unit and an alkyl methacrylate monomer unit each having 1 to 8 carbon atoms in the alkyl moiety thereof, and (B) is at least one member selected from the group consisting of an alkyl acrylate toohomer unit and an alkyl methacrylate monomer unit each having 10 or more carbon atoms and the total number of monomer units (A) and monomer units (B) constitutes more than 50% of the monomer units in the copolymer (b), and (c) a curing catalyst.

2. A contact adhesive using a curable composition as claimed in claim 1, wherein the oxyalkylene polymer (a) contains at least one alkoxysilyl group per molecule.

3. A contact adhesive using a curable composition as claimed in claim 1, wherein the oxyalkylene polymer (a) has a molecular weight satisfying Mw/Mn ratio is not higher than 1.5.

4. A contact adhesive using a curable composition as claimed in claim 3, wherein the Mw/Mn ratio is not higher than 1.4.

5. A contact adhesive using a curable composition as claimed in claim 1, wherein the oxyalkylene polymer (a) contains a monomer unit of formula (1) in a proportion of at least 50 % by weight;

$$-(R-O)_n- \tag{1}$$

wherein R represents a divalent alkylene group having 2 to 4 carbon atoms; and n represents a number of repeating units.

6. A contact adhesive using a curable composition as claimed in claim 5, wherein the oxyalkylene polymer (a) contains the monomer unit of formula (1) in a proportion of at least 80% by weight.

7. A contact adhesive using a curable composition as claimed in claim 1, wherein the oxyalkylene polymer (a) contains a reactive silicon group represented by formula (3);

$$\begin{array}{c} R^1_{2-b} \quad R^2_{3-c} \\ | \quad\quad | \\ (SiO)_m SiX_c \\ | \\ X_b \end{array} \tag{3}$$

wherein $R^1$ an $R^2$ each represents an alkyl group having 1 to 20 carbon atoms, an aryl group having 6 to 20 carbon atoms, an aralkyl group having 7 to 20 carbon atoms or a triorganosiloxy group represented by $(R')_3SiO-$, wherein each of the three R' groups, which may be the same or different, represents a monovalent hydrocarbon group having 1 to 20 carbon atoms; when there are two or more of each of the $R^1$ or $R^2$ groups, each of the $R^1$ and $R^2$ groups may be the same or different, and the $R^1$ may be the same or different from $R_2$; X represents a hydroxyl group or a hydrolyzable group; when there are two or more X groups, they may be the same or different; a represents 0, 1, 2 or 3;

a and b in each occurrence may be the same or different; and m represents 0 or an integer of from 1 to 19 satisfying the relationship $a+\Sigma b \geq 1$.

8. A method for the adhesion of adherends which comprises applying a curable composition to one or more adherend and bonding said adherends while tackiness is still present, wherein the curable composition comprising (a) an oxyalkylene polymer containing at least one reactive silicon group per molecule and having a number average molecular weight of not less than 3000 and an Mw/Mn ratio of not higher than 1.6, (b) a copolymer having a molecular chain which comprises monomer units (A) and monomer units (B), wherein (A) is at least one member selected from the group consisting an alkyl acrylate monomer unit and an alkyl methacrylate monomer unit each having 1 to 8 carbon atoms in the alkyl moiety thereof, and (B) is at least one member selected from the group consisting of an alkyl acrylate monomer unit and an alkyl methacrylate monomer unit each having 10 or more carbon atoms and the total number of monomer units (A) and monomer units (B) constitutes more than 50% of the monomer units in the copolymer (b), and (c) a curing catalyst.

9. A method as claimed in claim 8, wherein the oxyalkylene polymer (a) contains at least one alkoxysilyl group per molecule.

10. A method as claimed in claim 8, wherein the oxyalkylene polymer (a) has a molecular weight satisfying Mw/Mn ratio is not higher than 1.5.

11. A method as claimed in claim 10, wherein the Mw/Mn ratio is not higher than 1.4.

12. A method as claimed in claim 8, wherein the oxyalkylene polymer (a) contains a monomer unit of formula (i) in a proportion of at least 50% by weight;

—(R—O)$_n$—       (1)

wherein R represents a divalent alkylene group having 2 to 4 carbon atoms; and n represents a number of repeating units.

13. A method as claimed in claim 12, wherein the oxyalkylene polymer (a) contains the monomer unit of formula (1) in a proportion of at least 80% by weight.

14. A method as claimed in claim 8, wherein the oxyalkylene polymer (a) contains a reactive silicon group represented by formula (3);

$$\begin{array}{c} R^1_{2-b} \quad R^2_{3-a} \\ | \quad\quad | \\ (SiO)_m\!-\!SiX_a \\ | \\ X_b \end{array} \quad (3)$$

wherein $R^1$ an $R^2$ each represents an alkyl group having 1 to 20 carbon atoms, an aryl group having 6 to 20 carbon atoms, an aralkyl group having 7 to 20 carbon atoms or a triorganosiloxy group represented by (R')$_3$SiO—, wherein each of the three R' groups, which may be the same or different, represents a monovalent hydrocarbon group having 1 to 20 carbon atoms; when there are two or more of each of the $R^1$ or $R^2$ groups, each of the $R^1$ and $R^2$ groups may be the same or different, and the $R^1$ may be the same or different from $R_2$; X represents a hydroxyl group or a hydrolyzable group; when there are two or more X groups, they may be the same or different; a represents 0, 1, 2 or 3; b represents 0, 1, or 2; a and b in each occurrence may be the same or different; and m represents 0 or an integer of from 1 to 19 satisfying the relationship a+Σb≧1.

15. A process for producing a contact adhesive, by mixing components comprising (a) an oxyalkylene polymer containing at least one reactive silicon group per molecule and having a number average molecular weight of not less than 3000 and an Mw/Mn ratio of not higher than 1.6, (b) a copolymer having a molecular chain which comprises monomer units (A) and monomer units (B), wherein (A) is at least one member selected from the group consisting an alkyl acrylate monomer unit and alkyl methacrylate monomer unit each having 1 to 8 carbon atoms in the alkyl moiety thereof, and (B) is at least one member selected from the group consisting of an alkyl acrylate monomer unit and an alkyl methacrylate monomer unit each having 10 or more carbon atoms and the total number of monomer units (A) and monomer units (B) constitutes more than 50% of the monomer units in the copolymer (b), and (c) a curing catalyst.

16. A process as claimed in claim 15, wherein the oxyalkylene polymer (a) contains at least one alkoxysilyl group per molecule.

17. A process as claimed in claim 15, wherein the oxyalkylene polymer (a) has a molecular weight satisfying Mw/Mn ratio is not higher than 1.5.

18. A process as claimed in claim 17, wherein the Mw/Mn ratio is not higher than 1.4.

19. A process as claimed in claim 15, wherein the oxyalkylene polymer (a) contains a monomer unit of formula (1) in a proportion of at least 50% by weight;

—(R—O)$_n$—       (1)

wherein R represents a divalent alkylene group having 2 to 4 carbon atoms; and n represents a number of repeating units.

20. A process as claimed in claim 19, wherein the oxyalkylene polymer (a) contains the monomer unit of formula (1) in a proportion of at least 80% by weight.

21. A process as claimed in claim 15, wherein the oxyalkylene polymer (a) contains a reactive silicon group represented by formula (3);

$$\begin{array}{c} R^1_{2-b} \quad R^2_{3-a} \\ | \quad\quad | \\ (SiO)_m\!-\!SiX_a \\ | \\ X_b \end{array} \quad (3)$$

wherein $R^1$ an $R^2$ each represents an alkyl group having 1 to 20 carbon atoms, an aryl group having 6 to 20 carbon atoms, an aralkyl group having 7 to 20 carbon atoms or a triorganosiloxy group represented by (R')$_3$SiO—, wherein each of the three R' groups, which may be the same or different, represents a monovalent hydrocarbon group having 1 to 20 carbon atoms; when there are two or more of each of the $R^1$ or $R^2$ groups, each of the $R^1$ and $R^2$ groups may be the same or different, and the $R^1$ may be the same or different from $R^2$; X represents a hydroxyl group or a hydrolyzable group; when there are two or more X groups, they may be the same or different; a represents 0, 1, 2 or 3; b represents 0, 1, or 2; a and b in each occurrence may be the same or different; and m represents 0 or an integer of from 1 to 19 satisfying the relationship a+Σb≧1.

* * * * *